United States Patent
Yamada et al.

(10) Patent No.: US 11,142,134 B2
(45) Date of Patent: Oct. 12, 2021

(54) HOLDER DEVICE

(71) Applicant: TOYOTA JIDOSHA KABUSHIKI KAISHA, Toyota (JP)

(72) Inventors: Takako Yamada, Nagoya (JP); Yasuhisa Fujiwara, Miyoshi (JP); Yoshinari Maeda, Tajimi (JP); Yukinori Kawamura, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/674,684

(22) Filed: Nov. 5, 2019

(65) Prior Publication Data
US 2020/0156556 A1 May 21, 2020

(30) Foreign Application Priority Data
Nov. 16, 2018 (JP) .............................. JP2018-215531

(51) Int. Cl.
*B60R 11/00* (2006.01)
*F16M 13/02* (2006.01)

(52) U.S. Cl.
CPC ........... *B60R 11/00* (2013.01); *F16M 13/022* (2013.01); *B60R 2011/0078* (2013.01); *B60R 2011/0085* (2013.01); *F16M 2200/024* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,646,393 | B2* | 2/2014 | Souillac | B60N 3/002 108/45 |
| 8,708,296 | B2* | 4/2014 | Nemoto | B60R 11/02 248/346.06 |
| 9,014,393 | B2* | 4/2015 | Huh | B60R 11/02 381/87 |
| 10,391,950 | B2* | 8/2019 | Vander Sluis | B60R 11/02 |
| 10,569,719 | B2* | 2/2020 | Yamada | B60R 11/0241 |
| 10,640,053 | B2* | 5/2020 | Yamada | B60R 11/0252 |
| 10,793,083 | B1* | 10/2020 | Johns | B60R 7/04 |
| 10,814,797 | B2* | 10/2020 | Thain | B60R 11/0258 |
| 2007/0278373 | A1 | 12/2007 | Wang | |
| 2015/0343962 | A1 | 12/2015 | Le Leizour et al. | |

(Continued)

FOREIGN PATENT DOCUMENTS

JP 2016-500353 A 1/2016

*Primary Examiner* — Monica E Millner
(74) *Attorney, Agent, or Firm* — Oblon, McClelland, Maier & Neustadt, L.L.P.

(57) ABSTRACT

A holder device includes a first joint portion, and a second joint portion. One of the first joint portion and the second joint portion is movable in a directions toward and away from the other of the first joint portion and the second joint portion, and the one of the first joint portion and the second joint portion is urged by an urging member to a side where the one of the first joint portion and the second joint portion contacts the other of the first joint portion and the second joint portion. The one of the first joint portion and the second joint portion is provided with an operating portion that moves the one of the first joint portion and the second joint portion in the direction away from the other of the first joint portion and the second joint portion against an urging force of the urging member.

8 Claims, 7 Drawing Sheets

(56) References Cited

U.S. PATENT DOCUMENTS

2017/0237843 A1 8/2017 Ackeret et al.
2018/0345874 A1* 12/2018 Thain .................. B60R 11/0258
2019/0329715 A1* 10/2019 Yamada .............. B60R 11/0235

* cited by examiner

HOLDER DEVICE

INCORPORATION BY REFERENCE

The disclosure of Japanese Patent Application No. 2018-215531 filed on Nov. 16, 2018 including the specification, drawings and abstract is incorporated herein by reference in its entirety.

BACKGROUND

1. Technical Field

The disclosure relates to a holder device for a vehicle.

2. Description of Related Art

In Published Japanese Translation of PCT application No. 2016-500353 (JP 2016-500353 A), a holder device fixed to an instrument panel of a vehicle is disclosed. This holder device includes a case accommodated in a space that conforms to a 1DIN (Deutsches Institut für Normung) standard. In the case, a pair of rails extend along a vehicle front-rear direction. A support portion is attached onto these rails in a movable manner along the rails. A holder portion that holds a display is coupled to an end portion on a vehicle rear side of the support portion. The holder portion can rotate with respect to the support portion. One end of a support column is coupled to a portion on a vehicle front side (a back surface side when seen from a cabin side) of the holder portion. The other end of the support column is slidably coupled to the support portion. In a state where the holder portion stands upright with respect to the support portion, the holder portion is supported by the support column. In this way, the holder portion is prevented from collapsing to the support portion side.

SUMMARY

The holder device disclosed in JP 2016-500353 A is designed such that, in order to allow smooth movement of the support column with respect to the holder portion and the support portion, a clearance for sliding is provided at a position where the support column and the holder portion are coupled and at a position where the support column and the support portion are coupled. However, in the case where such a clearance exists between the support column and the holder portion and between the support column and the support portion, the support column possibly rattles with respect to the holder portion or the support portion at a time when vehicle vibrations are transmitted to the holder device. Such a problem not only occurs to the holder device as disclosed in JP 2016-500353 A, but also occurs similarly to a case where a member used to keep a posture of the holder portion is attached to the holder portion and the support portion.

One aspect of the disclosure relates to a holder device that includes: a holder portion configured to hold an item; and a support portion configured to support the holder portion. The holder portion is coupled to the support portion in such a manner as to be movable relative to the support portion, and a first joint portion provided in the support portion is locked to a second joint portion provided in the holder portion. In this way, the relative movement of the holder portion to the support portion is restricted. One of the first joint portion and the second joint portion is movable in a directions toward and away from the other of the first joint portion and the second joint portion, and the one of the first joint portion and the second joint portion is urged by an urging member to a side where the one of the first joint portion and the second joint portion contacts the other of the first joint portion and the second joint portion. The one of the first joint portion and the second joint portion is provided with an operating portion configured to move the one of the first joint portion and the second joint portion in the direction away from the other of the first joint portion and the second joint portion against an urging force of the urging member.

According to the above configuration, in the state where the first joint portion is locked to the second joint portion and the relative movement of the holder portion is restricted, one of the first joint portion and the second joint portion is brought into a state of being against the other thereof. Thus, a clearance between the first joint portion and the second joint portion is reduced, and rattling caused by presence of the clearance can be suppressed.

Note that, when a user operates the operating portion of the holder device, one of the first joint portion and the second joint portion can be separated from the other of the first joint portion and the second joint portion. Thus, in the case where the operating portion is operated, there is a low possibility that the first joint portion and the second joint portion hinder the smooth relative movement of the holder portion at the time of the relative movement of the holder portion.

In the above aspect, the one of the first joint portion and the second joint portion may include a plurality of groove portions that are arranged in a direction in which the holder portion moves relative to the support portion, and the other of the first joint portion and the second joint portion may include projected portions that are locked in the groove portions.

According to the above configuration, since the projected portion is locked in the groove portion, the relative movement of the holder portion with respect to the support portion is restricted, and thus a relative position of the holder portion is kept. In addition, since the plurality of the groove portions are arranged in a direction in which the holder portion moves relative to the support portion, the relative position of the holder portion can be kept at any of a plurality of positions.

In the above aspect, the holder portion may rotatably be coupled to the support portion through a rotation shaft. The second joint portion may include a plurality of holder-side tooth portions arranged in a circumferential direction with the rotation shaft being a center. The first joint portion may include a plurality of support portion-side tooth portions, each of which meshes with and is locked to a corresponding one of the holder-side tooth portions. Each of the holder-side tooth portions may extend to be inclined with respect to a central axis of the rotation shaft such that the holder-side tooth portion is inclined toward the first joint portion in a direction toward one side in a direction of the central axis of the rotation shaft. Each of the support portion-side tooth portions may extend to be inclined with respect to the central axis of the rotation shaft such that the support portion-side tooth portion is inclined toward the second joint portion in a direction toward the other side in the direction of the central axis of the rotation shaft. The urging member may urge the one of the first joint portion and the second joint portion in the direction of the central axis of the rotation shaft.

According to the above configuration, the force, which presses one of the first joint portion and the second joint portion against the other, is unlikely to be applied to the rotation shaft as a force in a direction perpendicular to an axial direction of the rotation shaft. Thus, it is possible to suppress deformation, such as distortion of the rotation shaft, by the urging force of the urging member.

In the above aspect, an adapter coupled to the support portion, a case in which the adapter is inserted, and a spacer interposed between an outer surface of the adapter and an inner surface of the case may be provided. The spacer may be attached to the adapter or the case in such a manner as to be slidable in a direction in which the adapter is pulled out from or inserted in the case.

According to the above configuration, the spacer fills a clearance between the outer surface of the adapter and the inner surface of the case. Thus, it is possible to suppress rattling between the adapter and the case caused by presence of the clearance. In addition, since the spacer is slidable, a circumstance where the spacer is stuck and the adapter cannot further be inserted in the case is unlikely to occur.

In the above aspect, the spacer may be attached to the adapter, and may be urged toward an end portion of the adapter, the end portion being inserted in the case. According to the above configuration, when the adapter is pulled out from the case, the spacer moves to an end portion, which is inserted in the case, in the adapter. Therefore, when the spacer is inserted in the case again, it is not required to manually move the spacer to the end portion of the adapter.

In the above aspect, a main wall portion of the spacer may have a rectangular plate shape, a dimension of the main wall portion in a vehicle width direction may be smaller than a dimension of the adapter in the vehicle width direction, and a dimension of the main wall portion in a vehicle front-rear direction may be smaller than a dimension of the adapter in the vehicle front-rear direction.

In the above aspect, a left edge of the main wall portion in the vehicle width direction may be inclined with respect to a right edge of the main wall portion in the vehicle width direction.

In the above aspect, a pair of spacer ribs may be projected from an upper surface of the main wall portion. In the vehicle front-rear direction, the spacer rib may extend from a rear edge to a front edge of the main wall portion, and a projection length of the spacer rib in an up-down direction may be reduced in a direction toward a vehicle front side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on an embodiment of a holder device H. In the following description, the holder device H is attached to a vehicle, and, in the case where a direction is specified in relation to the holder device H, the direction is expressed by using a front-rear, up-down, or vehicle width direction of the vehicle. In addition, in the case where left or right is specified in the vehicle width direction, a direction of the left or the right is set as to be seen from inside of a cabin toward a vehicle front side.

Figure 1:
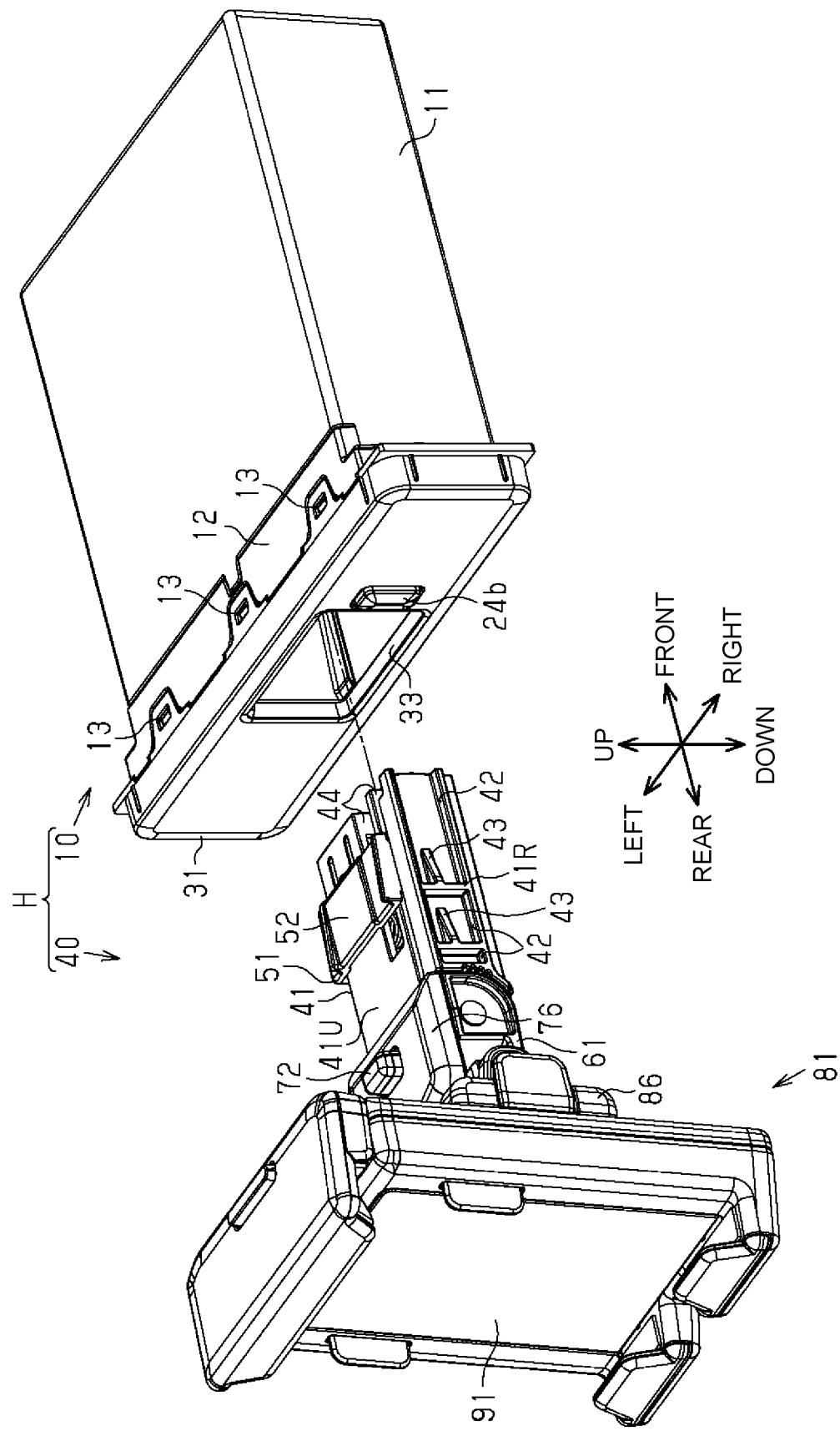
FIG. 1 is a perspective view of a holder device.

As shown in FIG. 1, the holder device H is configured to include: a retainer subassembly 10 attached to an instrument panel of the vehicle, and a holder subassembly 40 attached to this retainer subassembly 10. First, the retainer subassembly 10 of the holder device H will be described.

Figure 2:
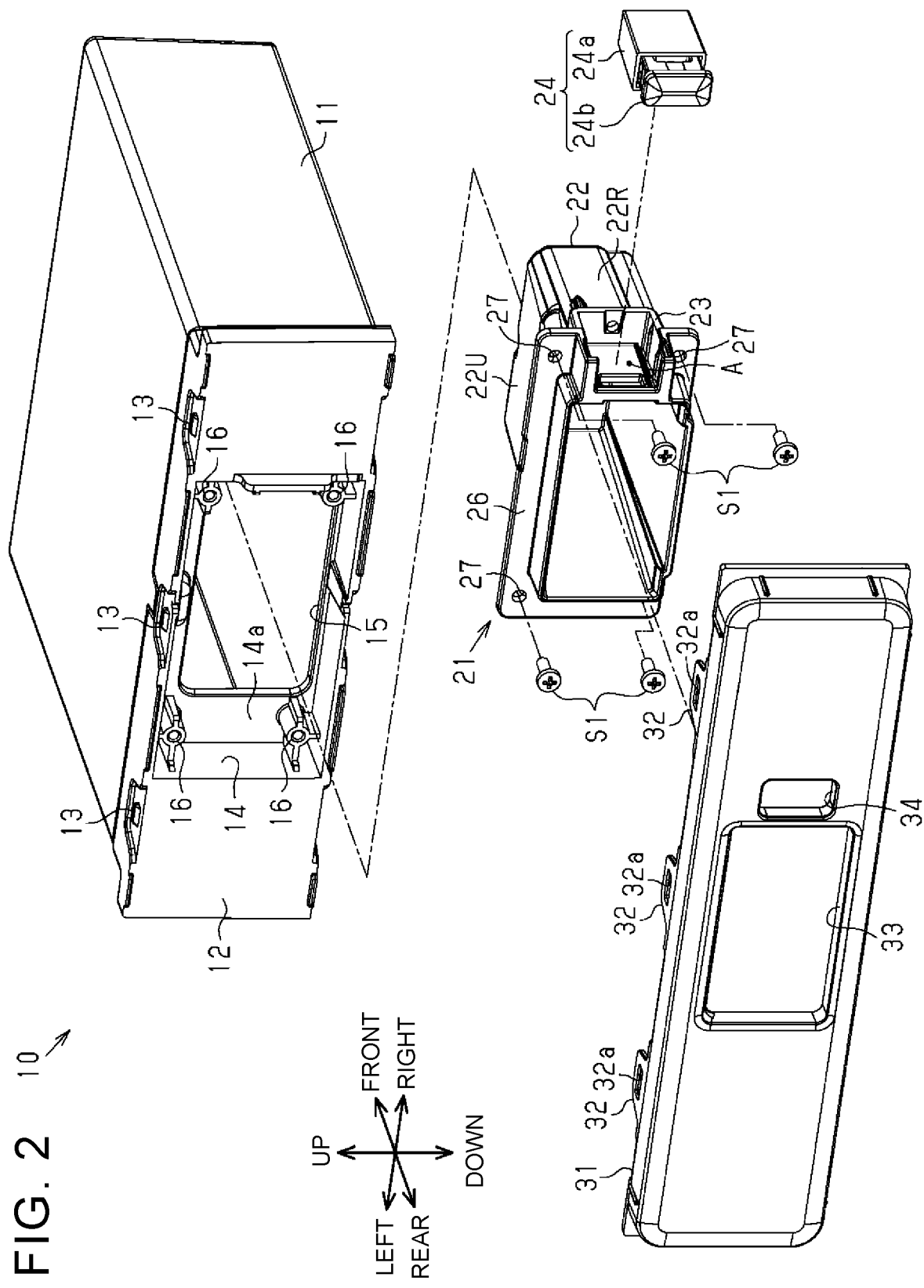
FIG. 2 is an exploded perspective view of a retainer subassembly.

As shown in FIG. 2, the retainer subassembly 10 includes a box-shaped retainer 11 that is vertically flat. The retainer 11 is inserted in an audio space on the instrument panel of the vehicle. In this embodiment, the retainer 11 has a shape and size that conform to a 1DIN standard. A rear portion (a cabin-side portion) of the retainer 11 in the vehicle front-rear direction is opened.

An inner panel 12 is attached to an opening edge of the retainer 11. In a plan view in which the inner panel 12 is seen in the vehicle front-rear direction, the inner panel 12 has a rectangular shape that is slightly larger than an opening shape of the retainer 11. The inner panel 12 is attached such that edges on both sides of the inner panel 12 in the vehicle width direction respectively surround edges on both sides of the retainer 11 in the vehicle width direction from outer sides. On an upper surface and a lower surface of the inner panel 12, a plurality of locking pieces 13 are projected. In this embodiment, a total of the six locking pieces 13, three on the upper surface and three on the lower surface of the inner panel 12, is provided.

In a central portion of the inner panel 12 in the vehicle width direction, a dented portion 14 is dented toward the vehicle front side. The dented portion 14 has a rectangular shape when seen from a vehicle rear side. An opening 15 is opened in a bottom surface 14a (a surface on the front side in the vehicle front-rear direction) of the dented portion 14. The opening 15 has a rectangular shape when seen in the plan view. The retainer 11 communicates with inside and outside thereof via this opening 15. A boss 16 in a substantially cylindrical shape is projected toward the vehicle rear side from the bottom surface 14a of the dented portion 14. The boss 16 is provided near each of four corners of the opening 15.

A case 21 is attached to the inner panel 12. The case 21 includes a case body 22 in a hollow rectangular column shape with a bottom. The case body 22 is in such size that the case body 22 can be inserted into the opening 15 of the inner panel 12. The case body 22 is arranged such that an opened side is directed to the vehicle rear side, a bottom side is directed to the vehicle front side, and a portion on the bottom side of the case body 22 is inserted through the opening 15.

Figure 3:
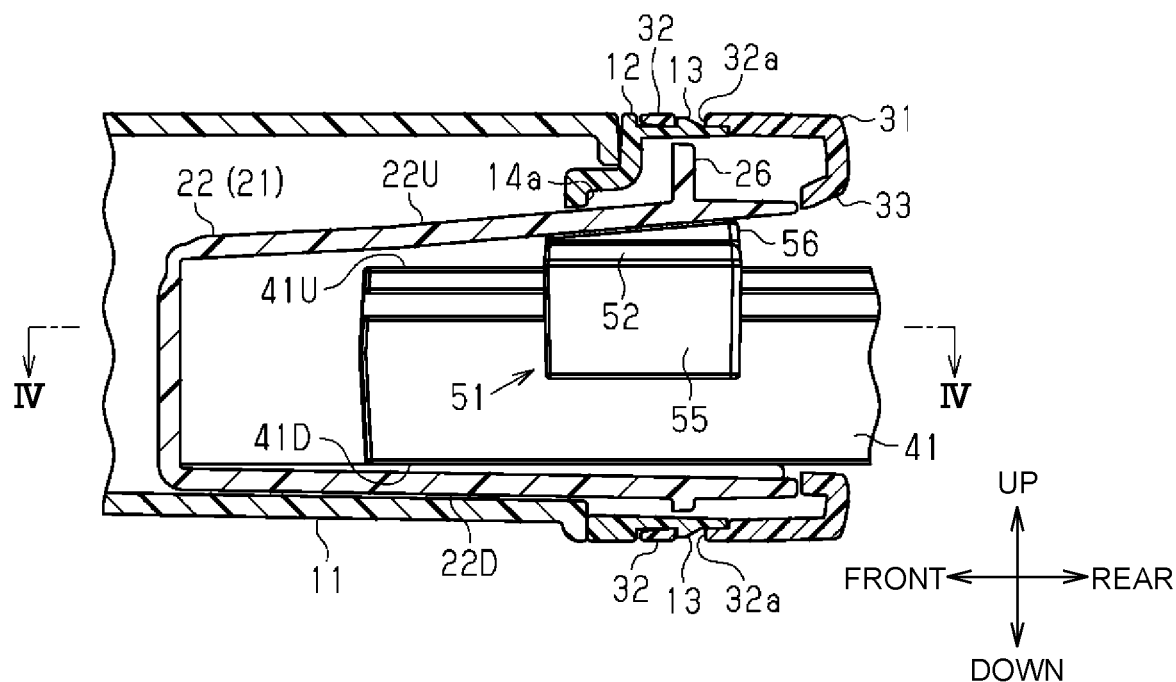
FIG. 3 is an end view of a part of the retainer subassembly that is seen from a vehicle width direction.

The case body 22 has an inversely tapered shape in which an opening area is increased in a direction toward the vehicle rear side. More specifically, as shown in FIG. 3, of four peripheral wall portions of the case body 22, a lower wall portion 22D located on a vehicle lower side extends in parallel with the vehicle front-rear direction. Of the four peripheral wall portions of the case body 22, an upper wall portion 22U opposing the lower wall portion 22D is inclined with respect to the lower wall portion 22D. More specifically, the upper wall portion 22U is inclined such that a distance between the upper wall portion 22U to the lower wall portion 22D is increased in the direction toward the vehicle rear side. An inclination angle of the upper wall portion 22U with respect to the lower wall portion 22D is several degrees (for example, about five degrees).

Figure 4:
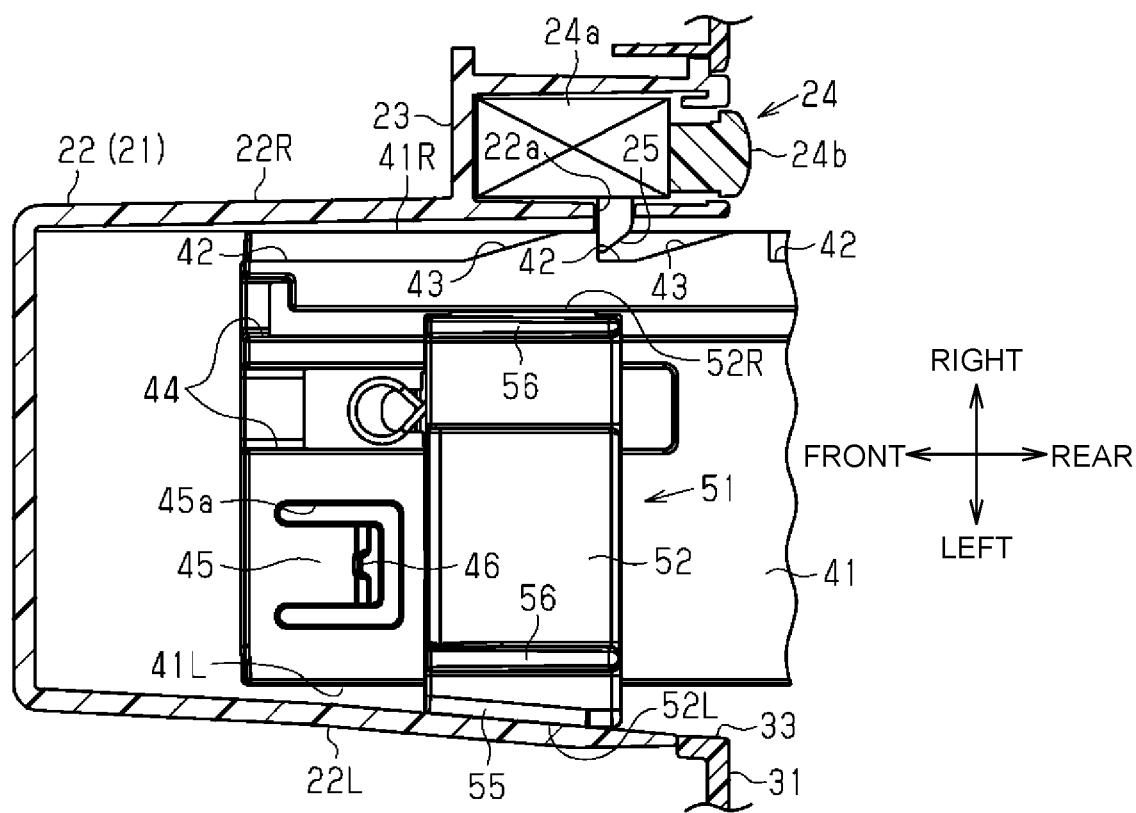
FIG. 4 is an end view taken along line IV-IV in FIG. 3.

As shown in FIG. 4, of the four peripheral wall portions of the case body 22, a right wall portion 22R located on a right side in the vehicle width direction extends in parallel with the vehicle front-rear direction. Of the four peripheral wall portions of the case body 22, a left wall portion 22L opposing the right wall portion 22R is inclined with respect to the right wall portion 22R. More specifically, the left wall portion 22L is inclined such that a distance between the left wall portion 22L and the right wall portion 22R is increased in the direction toward the vehicle rear side. An inclination angle of the left wall portion 22L with respect to the right wall portion 22R is several degrees (for example, about five degrees).

As shown in FIG. 2, a partitioning wall 23 is projected from an outer surface of the right wall portion 22R in the case body 22. The partitioning wall 23 is configured to include: a pair of wall portions that extend in the vehicle front-rear direction; and a wall portion that couples these wall portions on the vehicle front side. In other words, the partitioning wall 23 extends in a "laterally facing U" shape when seen from the right side in the vehicle width direction. An accommodation space A in a substantially cubic shape is partitioned by this partitioning wall 23.

A lock mechanism 24 is accommodated in the accommodation space A of the case 21. The lock mechanism 24 is configured to include a mechanism portion 24a in a cubic shape and a button portion 24b projected from the mechanism portion 24a. The button portion 24b is urged by a spring included in the mechanism portion 24a to a side where the button portion 24b is projected from the mechanism portion 24a. As shown in FIG. 4, a lock claw 25 is projected from a lateral surface of the mechanism portion 24a. Although a detailed description on a mechanism will not be made, the lock claw 25 is accommodated in the mechanism portion 24a when the button portion 24b is pressed into the mechanism portion 24a against an urging force from the mechanism portion 24a.

The lock mechanism 24 is fitted into the accommodation space A such that the button portion 24b is located on the vehicle rear side and the lock claw 25 is projected to the left in the vehicle width direction. The mechanism portion 24a of the lock mechanism 24 is fixed to the partitioning wall 23 by a screw, which is not shown. Note that a through hole 22a penetrates the right wall portion 22R of the case body 22. In the state where the lock mechanism 24 is fitted in the accommodation space A, the lock claw 25 of the lock mechanism 24 can be projected from an inner surface of the right wall portion 22R via the through hole 22a.

As shown in FIG. 2, a flange 26 in a plate shape is bulged outward from an outer circumferential surface of the case body 22. In a circumferential direction of the case body 22, the flange 26 extends over an entire portion of the case body 22 except for the above-described accommodation space A. When seen in the vehicle front-rear direction, the flange 26 has a substantially rectangular shape that corresponds to an opening shape of the dented portion 14 of the inner panel 12. Screw holes 27 penetrate four corners of the flange 26. Positions of the screw holes 27 correspond to positions of the bosses 16 in the inner panel 12. Screws S1 that penetrate the screw holes 27 of the flange 26 are fastened to the bosses 16 in the inner panel 12. In this way, the case 21 is fixed to the retainer 11.

An outer panel 31 in a substantially plate shape is attached to the inner panel 12. When seen in the plan view, the outer panel 31 has a rectangular shape that is substantially the same as the inner panel 12. The outer panel 31 is attached to the inner panel 12 in such a manner as to cover the inner panel 12 from the vehicle rear side. From an upper edge and a lower edge of the outer panel 31, locking projection portions 32 are projected toward the vehicle front side. A through hole 32a penetrates each of the locking projection portions 32 in the vehicle up-down direction. In such a manner as to correspond to the locking pieces 13 of the inner panel 12, the three locking projection portions 32 are projected from the upper edge of the outer panel 31, and the three locking projection portions 32 are projected from the lower edge of the outer panel 31. As shown in FIG. 3, each of the locking pieces 13 of the inner panel 12 is joined and locked in corresponding one of the through holes 32a of the locking projection portions 32 in the outer panel 31. In this way, the outer panel 31 is fixed to the inner panel 12.

As shown in FIG. 2, in the vehicle front-rear direction, an opening 33 penetrates a central portion of the outer panel 31 in the vehicle width direction. In a plan view in which the opening 33 is seen in the vehicle front-rear direction, the opening 33 has the same rectangular shape as a shape of an opening edge of the case body 22. On the right side of the opening 33 of the outer panel 31 in the vehicle width direction, a window portion 34 penetrates the outer panel 31 in the vehicle front-rear direction. As shown in FIG. 1, in the state where the outer panel 31 is attached to the inner panel 12, an internal space of the case body 22 in the case 21 communicates with the outside via the opening 33 of the outer panel 31. In addition, the button portion 24b of the lock mechanism 24 is exposed to the outside via the window portion 34 of the outer panel 31.

Figure 6:
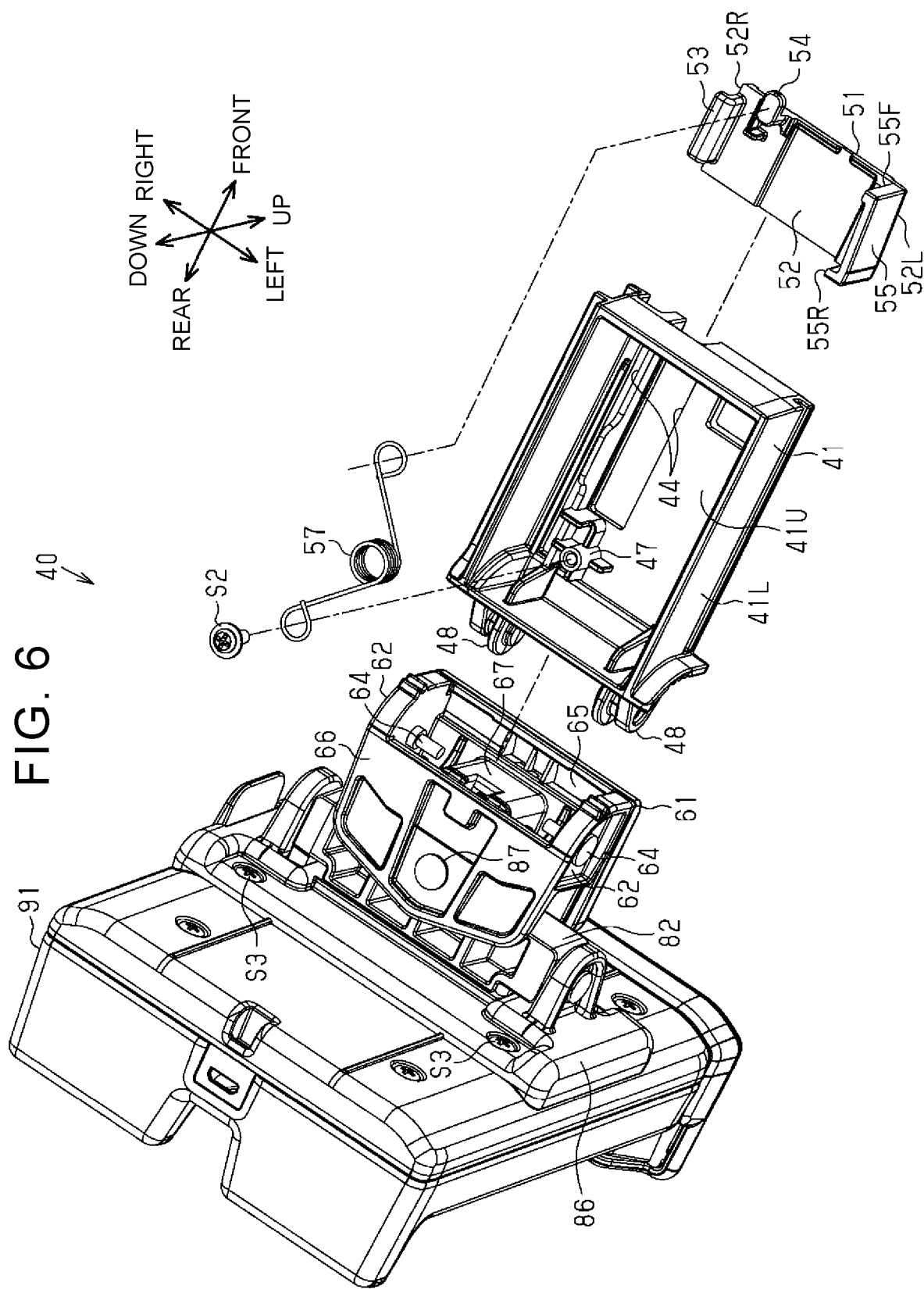
FIG. 6 is an exploded perspective view of the holder subassembly.

Next, the holder subassembly 40 will be described. As shown in FIG. 1, the holder subassembly 40 includes an adapter 41 that is inserted in the case body 22 of the case 21 via the opening 33 of the outer panel 31. As shown in FIG. 6, the adapter 41 has a hollow box shape. A lower portion of the adapter 41 is opened. That is, the adapter 41 does not have a lower wall, and the inside of the adapter 41 is exposed to the lower side.

As shown in FIG. 1, dimensions of the adapter 41 in the up-down direction and the vehicle width direction are slightly smaller than dimensions of the opening edge of the case body 22 in the up-down direction and the vehicle width direction. In addition, a dimension of the adapter 41 in the vehicle front-rear direction is smaller than a dimension of the case body 22 in the vehicle front-rear direction.

As shown in FIG. 3, an upper wall portion 41U and a lower edge 41D of the adapter 41 extend in parallel with each other. In addition, as shown in FIG. 4, a right wall portion 41R on the right side of the adapter 41 in the vehicle width direction and a left wall portion 41L on the left side of the adapter 41 in the vehicle width direction extend in parallel with each other. In FIG. 3, the case 21 is shown in an end view, and the adapter 41 is shown in a side view. In FIG. 4, the case 21 is shown in the end view, and the adapter 41 is shown in a top view.

Figure 5:
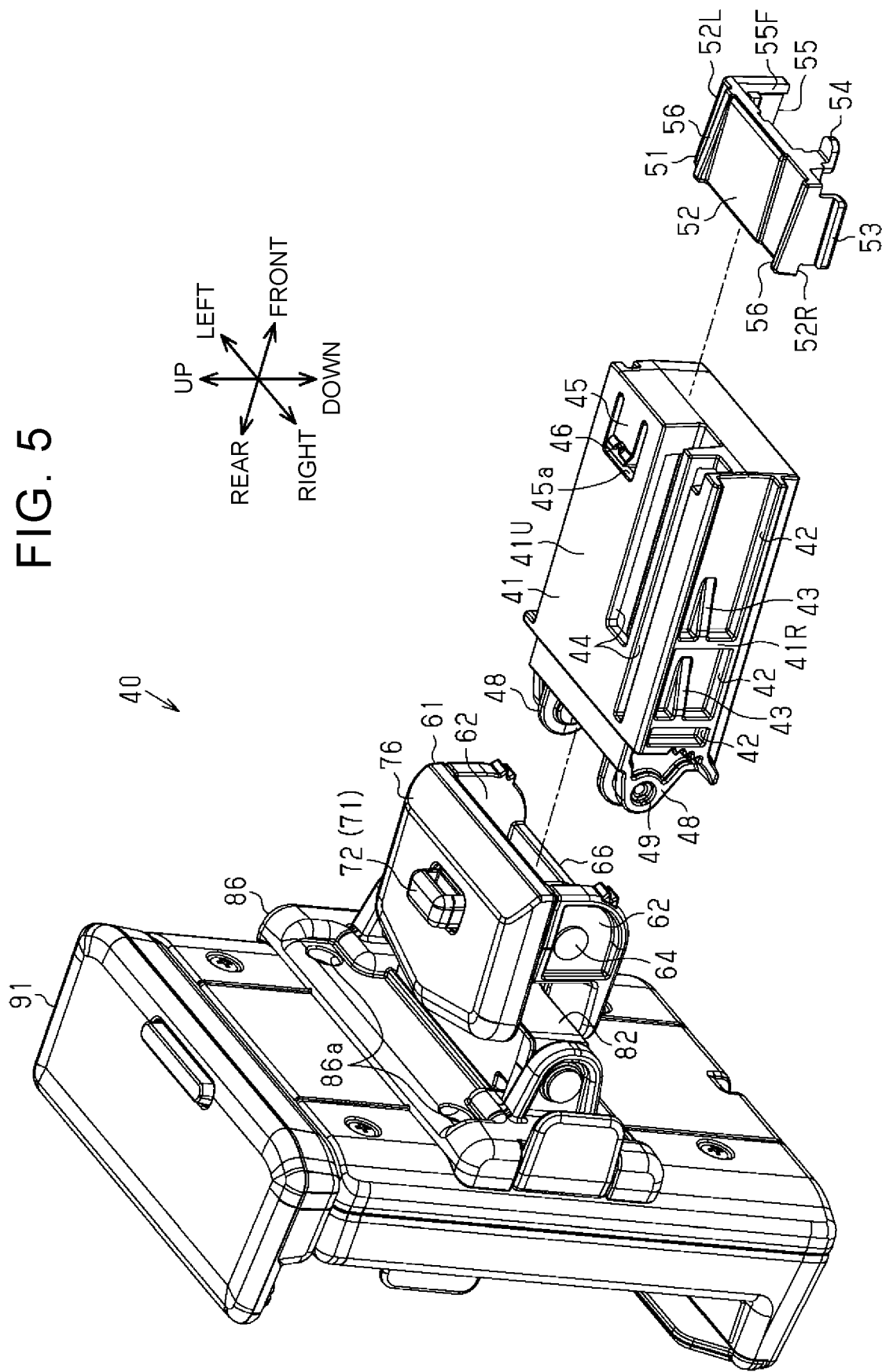
FIG. 5 is an exploded perspective view of a holder subassembly.

As shown in FIG. 5, a plurality of locking recess portions 42 are dented on an outer surface of the right wall portion 41R in the adapter 41. In this embodiment, the three locking recess portions 42 are arranged in the vehicle front-rear direction. Dimensions of the locking recess portions 42 in the vehicle front-rear direction are increased toward the vehicle front side.

Of the three locking recess portions 42, in each of the two locking recess portions 42 on the front side in the vehicle front-rear direction, a guide rib 43 is projected from a bottom surface (a surface on the left side in the vehicle width direction). The guide rib 43 extends toward the vehicle front side from an edge on the vehicle rear side of each of the locking recess portions 42. In addition, projection lengths of the guide ribs 43 are increased in the direction toward the vehicle rear side.

As shown in FIG. 4, in the state where the adapter 41 is inserted in the case body 22 of the case 21, the lock claw 25 of the lock mechanism 24 is projected to the inside of the locking recess portion 42 of the adapter 41. Accordingly, when it is attempted to pull out the adapter 41 from the case 21, the lock claw 25 is stuck by a step between the adjacent locking recess portions 42. Thus, removal of the adapter 41 is restricted.

As shown in FIG. 5, two guide slits 44 penetrate the upper wall portion 41U of the adapter 41. Each of the guide slits 44 extends in the vehicle front-rear direction. In addition, the two guide slits 44 reach an end portion on the vehicle front side of the adapter 41.

A part of the upper wall portion 41U in the adapter 41 is configured as a flexing spring 45. More specifically, in the top view, a U-shaped slit 45a penetrates the upper wall portion 41U, and an inner portion of the U-shaped slit 45a serves as the flexing spring 45. In this embodiment, the slit 45a is located on both of the sides of the flexing spring 45 in the vehicle width direction and on the rear side of the flexing spring 45 in the vehicle front-rear direction, and the flexing spring 45 is supported in a cantilevered manner on the vehicle front side.

A restricting projection 46 is projected from an upper surface of the flexing spring 45. The restricting projection 46 is projected from an edge portion on the vehicle rear side of the flexing spring 45. A tip surface of the restricting projection 46 is inclined to be lowered in a direction toward the vehicle front side.

To the adapter 41, a spacer 51 is attached in such a manner as to be slidable in the vehicle front-rear direction. A main wall portion 52 of the spacer 51 has a rectangular plate shape in the plan view. A dimension of the main wall portion 52 in the vehicle width direction is smaller than a dimension of the adapter 41 in the vehicle width direction. In addition, a dimension of the main wall portion 52 in the vehicle front-rear direction is smaller than a dimension of the adapter 41 in the vehicle front-rear direction.

As shown in FIG. 4, a left edge 52L of the main wall portion 52 in the vehicle width direction is inclined with respect to a right edge 52R of the main wall portion 52 in the vehicle width direction. That is, the left edge 52L of the main wall portion 52 in the vehicle width direction is inclined with respect to a direction in which the spacer 51 is actuated. More specifically, the left edge 52L extends such that a distance between the left edge 52L and the right edge 52R is increased toward the rear side in the vehicle front-rear direction. An inclination angle of the left edge 52L with respect to the right edge 52R is equal to an inclination angle of the left wall portion 22L of the case 21 with respect to the right wall portion 22R of the case 21.

As shown in FIG. 5 and FIG. 6, from the right edge 52R of the main wall portion 52 in the vehicle width direction, a lateral wall portion 53 in a substantially rectangular plate shape extends downward. The lateral wall portion 53 extends at an angle of approximately 90 degrees with respect to the main wall portion 52. A part on a tip (lower end) side of the lateral wall portion 53 is bent to the right side in the vehicle width direction. A locking projection 54 in a band plate shape is projected downward from a lower surface of the main wall portion 52. A part of the locking projection 54 is bent to the vehicle front side. A distance between the locking projection 54 and the lateral wall portion 53 in the vehicle width direction is the same as a distance between the above-described pair of the guide slits 44 in the vehicle width direction.

From the left edge 52L of the main wall portion 52 in the vehicle width direction, an inclined wall portion 55 in a substantially rectangular plate shape extends downward. As described above, since the left edge 52L of the main wall portion 52 in the vehicle width direction is inclined with respect to the right edge 52R of the main wall portion 52 in the vehicle width direction, the inclined wall portion 55 is also inclined with respect to the lateral wall portion 53. That is, the inclined wall portion 55 is inclined with respect to the direction in which the spacer 51 is actuated.

As shown in FIG. 6, from a front edge of the inclined wall portion 55 in the vehicle front-rear direction, a projected portion 55F is projected to the right side in the vehicle width direction. The projected portion 55F extends over an entire range of the front edge of the inclined wall portion 55 in the vehicle front-rear direction. In addition, from a rear edge of the inclined wall portion 55 in the vehicle front-rear direction, a projected portion 55R is projected to the right side in the vehicle width direction. The projected portion 55R extends over an entire range of the rear edge of the inclined wall portion 55 in the vehicle front-rear direction. A projection length of the projected portion 55R on the rear side is longer than a projection length of the projected portion 55F on the front side. More specifically, the projection length of each of the projected portions 55R, 55F is designed such that, when a virtual plane including both of a projected tip of the projected portion 55R on the rear side and a projected tip of the projected portion 55F on the front side is considered, the virtual plane and the lateral wall portion 53 are parallel with each other.

A pair of spacer ribs 56 are projected from an upper surface of the main wall portion 52. In the vehicle front-rear direction, each of the spacer ribs 56 extends from a rear edge of the main wall portion 52 to a front edge thereof. A projection length of each of the spacer ribs 56 in the up-down direction is reduced in the direction toward the vehicle front side. As shown in FIG. 3, an upper edge of each of the spacer ribs 56 extends linearly and is inclined with respect to the main wall portion 52. That is, the upper edge of each of the spacer ribs 56 is inclined with respect to the direction in which the spacer 51 is actuated. An inclination angle of the upper edge of each of the spacer ribs 56 with respect to the main wall portion 52 is the same as the inclination angle of the upper wall portion 22U with respect to the lower wall portion 22D of the case body 22.

The spacer 51 described above is attached to an upper surface of the upper wall portion 41U of the adapter 41. More specifically, the spacer 51 is arranged such that the main wall portion 52 follows the upper surface of the upper wall portion 41U in the adapter 41 and that the inclined wall portion 55 follows an outer surface of the left wall portion 41L in the adapter 41. In this state, the tips of the projected portions 55F, 55R in the inclined wall portion 55 abut the outer surface of the left wall portion 41L in the adapter 41. Accordingly, as shown in FIG. 4, the inclined wall portion 55 is inclined with respect to the left wall portion 41L of the adapter 41 such that a distance between the inclined wall portion 55 and the left wall portion 41L is increased in the direction toward the vehicle rear side.

In the state where the spacer 51 is attached to the upper wall portion 41U of the adapter 41, the lateral wall portion 53 and the locking projection 54 in the spacer 51 are inserted in the guide slits 44 of the adapter 41. Thus, while being guided in the guide slit 44 of the adapter 41, the spacer 51 slides on the adapter 41 in the vehicle front-rear direction.

As shown in FIG. 6, an end of a torsion spring 57 is fixed to a tip of the locking projection 54 in the spacer 51. The other end of the torsion spring 57 is fixed to a boss 47 by a screw S2. The boss 47 is projected from a lower surface of the upper wall portion 41U in the adapter 41. In the state where the torsion spring 57 is fixed to the locking projection 54 of the spacer 51 and the boss 47 of the adapter 41, the torsion spring 57 is elastically deformed such that a distance between both ends of the torsion spring 57 extends. That is, the torsion spring 57 attempts to elastically return, so as to reduce the distance between both ends thereof. In conjunction with the above, the spacer 51 is urged to slide toward the vehicle rear side.

As shown in FIG. 5, from a rear edge of the right wall portion 41R in the adapter 41 in the vehicle front-rear direction, an arm 48 is projected to the vehicle rear side. On an outer surface on the outer side of the arm 48 in the vehicle width direction, a shaft receiving hole 49 is dented inward in the vehicle width direction. The shaft receiving hole 49 is a circular hole in the plan view. A similar arm 48 is projected from an edge on the vehicle rear side of the left wall portion 41L in the adapter 41.

Figure 7:
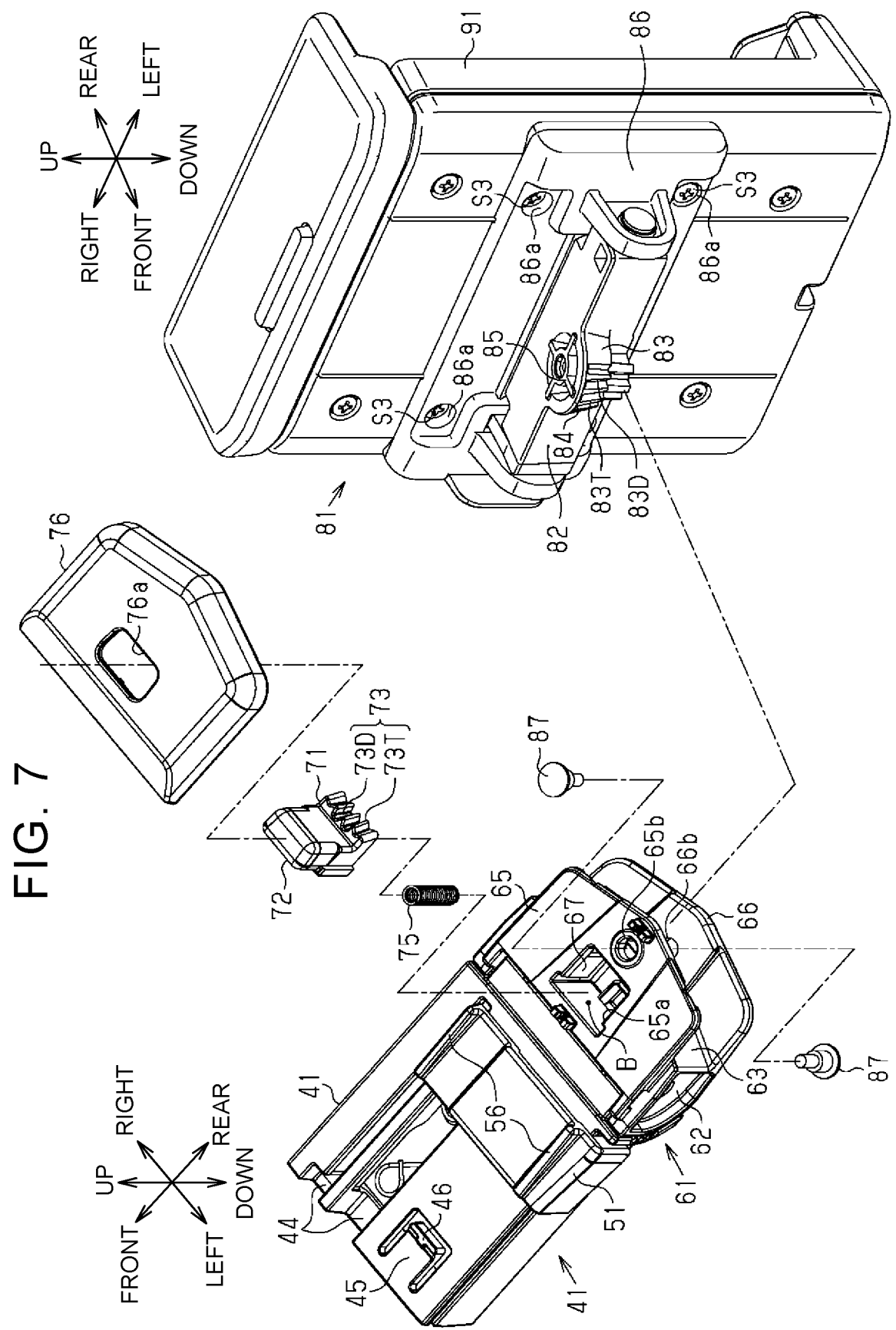
FIG. 7 is an exploded perspective view of the holder subassembly.
Figure 10:
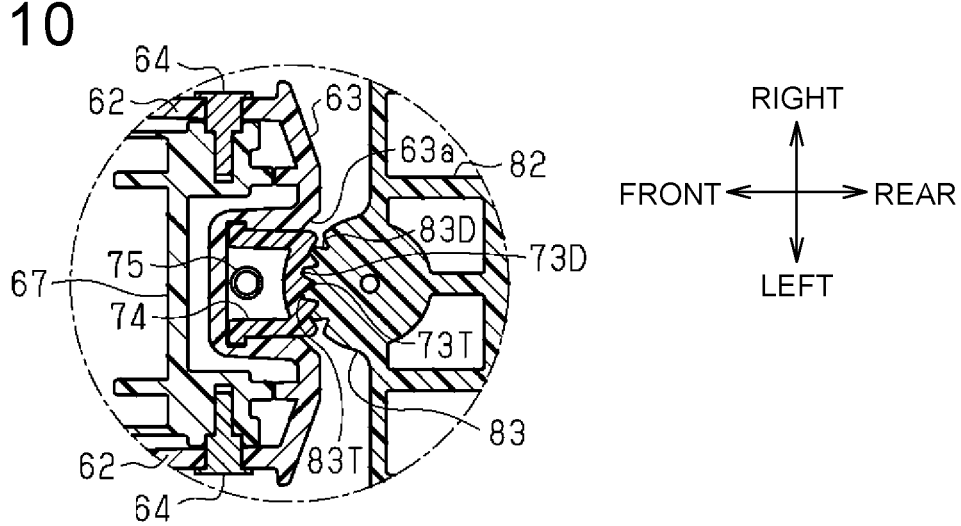
FIG. 10 is a cross-sectional view taken along line X-X in FIG. 8.

As shown in FIG. 5 and FIG. 6, a support portion 61 is coupled to a pair of the arms 48 of the adapter 41. The support portion 61 includes a pair of lateral plate portions 62 that are arranged to be separated from each other in the vehicle width direction. The lateral plate portions 62 are arranged in parallel with each other. A separation distance between the lateral plate portions 62 is substantially the same as a distance between the outer surfaces of the pair of the arms 48 in the adapter 41. As shown in FIG. 7 and FIG. 10, rear edges of the pair of the lateral plate portions 62 in the vehicle front-rear direction are coupled to a coupling plate 63 that extends in the vehicle width direction. A dimension of the coupling plate 63 in the up-down direction is the same as a dimension of each of the lateral plate portions 62 in the up-down direction. As shown in FIG. 10, in a central portion of the coupling plate 63 in the vehicle width direction, a window portion 63a is opened in the vehicle front-rear direction.

From the outer side in the vehicle width direction, a shaft pin 64 penetrates each of the lateral plate portions 62. As a result, from an inner surface of each of the lateral plate portions 62 in the vehicle width direction, a shaft of the shaft pin 64 is projected inward in the vehicle width direction. The shafts of these shaft pins 64 are inserted through the shaft receiving holes 49 of the arms 48 in the adapter 41. Accordingly, the support portion 61 can rotate in the up-down direction with respect to the adapter 41 with the shaft of each of the shaft pins 64 being a rotation shaft.

As shown in FIG. 7, an upper plate portion 65 is fixed to an upper edge of each of the lateral plate portions 62 in such a manner as to close a space between these lateral plate portions 62 from above. The upper plate portion 65 has a substantially rectangular shape in the plan view. A front edge of the upper plate portion 65 reaches a front edge of each of the lateral plate portions 62. A rear portion of the upper plate portion 65 partially reaches a position behind a rear edge of each of the lateral plate portions 62 and the coupling plate 63.

As shown in FIG. 7, an opening 65a penetrates the upper plate portion 65 in a thickness direction of the upper plate portion 65. The opening 65a is located in a central portion of the upper plate portion 65 in the vehicle front-rear direction. In addition, in the upper plate portion 65, the opening 65a is located in front of the coupling plate 63. The opening 65a has a substantially rectangular shape in the plan view. In the thickness direction of the upper plate portion 65, a circular hole 65b penetrates a portion of the upper plate portion 65 that is located behind the coupling plate 63.

As shown in FIG. 6, a lower plate portion 66 is fixed to a lower edge of each of the lateral plate portions 62 in such a manner as to close the space between these lateral plate portions 62 from below. The lower plate portion 66 has a substantially rectangular shape in the plan view. A front edge of the lower plate portion 66 is located in front of the coupling plate 63 and is located behind the front edge of each of the lateral plate portions 62. A rear portion of the lower plate portion 66 partially reaches a position behind the rear edge of each of the lateral plate portions 62 and the coupling plate 63. A projection length of the lower plate portion 66 to the rear side is the same as a projection length of the upper plate portion 65 to the rear side. As shown in FIG. 7, in a thickness direction of the lower plate portion 66, a circular hole 66b penetrates a portion of the lower plate portion 66 that is located behind the coupling plate 63. A position of the circular hole 66b is set such that a center of the circular hole 66b in the lower plate portion 66 is located on a central axis of the circular hole 65b in the upper plate portion 65.

As shown in FIG. 6, a division plate 67 is provided upward from an upper surface of the lower plate portion 66. An upper edge of the division plate 67 reaches a lower surface of the upper plate portion 65. That is, the division plate 67 connects the lower plate portion 66 and the upper plate portion 65. When seen in the vehicle up-down direction, the division plate 67 extends substantially in a U-shape, a portion of which on the vehicle rear side is opened. Both ends of the U shape of the division plate 67 are coupled to the coupling plate 63. The division plate 67 is located in a central portion of the support portion 61 in the vehicle width direction. As shown in FIG. 10, a space B that is surrounded by the division plate 67 communicates with a space behind the coupling plate 63 via the window portion 63a of the coupling plate 63.

As shown in FIG. 7, a knob gear 71 as a first joint portion is accommodated in the space B, which is surrounded by the division plate 67. An operating portion 72 of the knob gear 71 has a substantially rectangular column shape. A gear portion 73 is provided on a rear surface of the operating portion 72. The gear portion 73 is configured to include: three tooth portions 73T that are arranged substantially in the vehicle width direction; and four groove portions 73D, each of which is provided adjacent to one or two of the tooth portions 73T. In this embodiment, when tooth bottoms of the gear portions 73 (bottoms of the groove portions 73D) are virtually connected, such a virtual line has an arcuate shape. Then, each of the tooth portions 73T is projected from a center of the arc of the virtual line. In the drawings, only some of the plurality of the tooth portions 73T and only some of the plurality of the groove portions 73D are denoted by the reference numerals and symbols.

Figure 8:
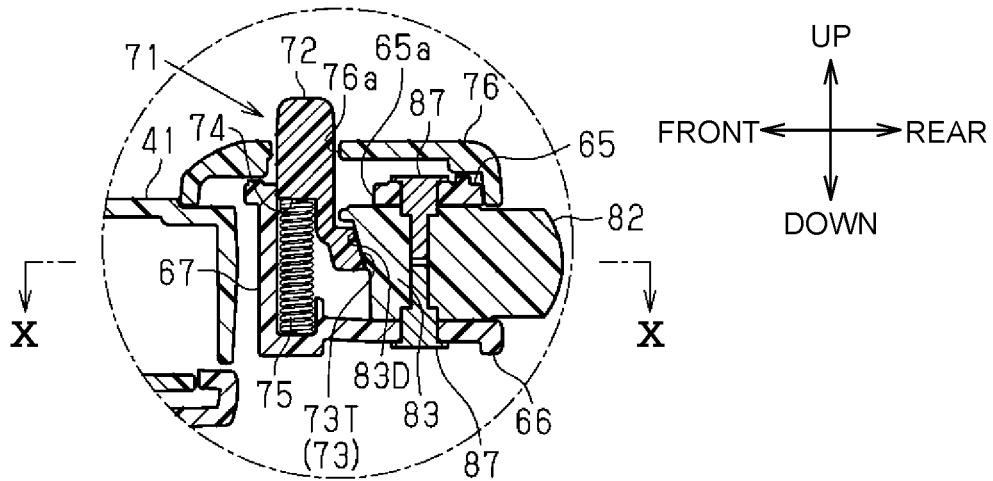
FIG. 8 is an end view of a part of the holder subassembly that is seen from the vehicle width direction.
Figure 9:
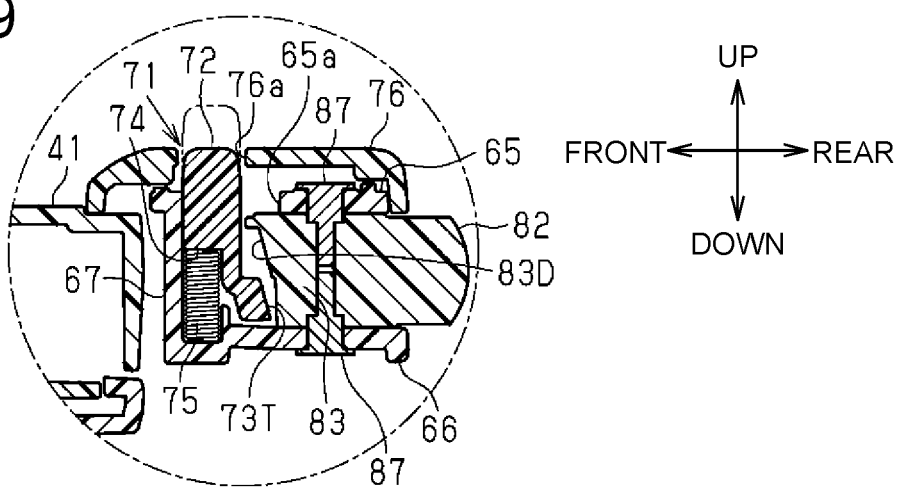
FIG. 9 is an end view of a part of the holder subassembly that is seen from the vehicle width direction.

As shown in FIG. 8 and FIG. 9, each of the tooth portions 73T extends downward from a lower end of the operating portion 72. A dimension of each of the tooth portions 73T in the up-down direction is less than a half of a distance between the upper plate portion 65 and the lower plate portion 66. In this embodiment, the dimension of each of the tooth portions 73T in the up-down direction is approximately one-fourth of a dimension of the operating portion 72 in the up-down direction. An addendum of each of the tooth portions 73T moves to the vehicle rear side as extending downward. That is, each of the tooth portions 73T is inclined to extend such that each of the tooth portions 73T is inclined toward the vehicle rear side in a downward direction.

A spring accommodating portion 74 is dented upward in a lower surface of the operating portion 72. The spring accommodating portion 74 is a dent in a substantially rectangular column shape that extends in the up-down direction. A coil spring 75 as an urging member is accommodated in the spring accommodating portion 74. An upper end of the coil spring 75 abuts an upper surface of the spring accommodating portion 74, and a lower end of the coil spring 75 abuts the upper surface of the lower plate portion 66 in the support portion 61. Accordingly, the coil spring 75 urges the knob gear 71 upward.

As shown in FIG. 7, a plate-shaped cover 76 is attached to an upper surface of the upper plate portion 65. The cover 76 has substantially the same shape as the upper plate portion 65 in the plan view. An opening 76a penetrates the cover 76 in a thickness direction of the cover 76. The opening 76a has a substantially rectangular shape in the plan view. In the vehicle front-rear direction and the vehicle width direction, dimensions of the opening 76a are slightly larger than the dimensions of an upper surface of the operating portion 72 in the knob gear 71. The opening 76a is arranged at a position where the opening 76a overlaps the opening 65a of the upper plate portion 65 when the cover 76 is attached to the upper plate portion 65. As shown in FIG. 8, in the state where the cover 76 is attached to the upper plate portion 65, a part of the operating portion 72 in the knob gear 71 can be projected above the cover 76 via the opening 65a of the upper plate portion 65 and the opening 76a of the cover 76.

As shown in FIG. 7, a holder portion 81 is coupled between the upper plate portion 65 and the lower plate portion 66 in the support portion 61. The holder portion 81 includes a base portion 82 in a rectangular column shape that extends in the vehicle width direction. A dimension of the base portion 82 in the up-down direction is substantially the same as the distance between the upper plate portion 65 and the lower plate portion 66 in the support portion 61.

From a surface on the vehicle front side of the base portion 82, a gear body 83 as a second joint portion is projected to the vehicle front side. The gear body 83 has a semi-cylindrical shape that substantially extends in the up-down direction. A radius of curvature of a semicircle of the gear body 83 is the same as a radius of curvature of the arc that is defined by virtually connecting the tooth bottoms of the tooth portions 73T in the gear portion 73 described above. From an upper end of the gear body 83, a flange 84 is bulged to the outer side of the gear body 83 in a radial direction.

From an outer circumferential surface (a surface on the vehicle front side) of the gear body 83, four tooth portions 83T are projected outward in the radial direction. The tooth portions 83T are arranged in a circumferential direction of the gear body 83. Along with this, a groove portion 83D is provided between each adjacent pair of the tooth portions 83T. Note that, in this embodiment, the groove portion 83D is further provided on the outer side of the tooth portion 83T at each end in the circumferential direction. Thus, the five groove portions 83D are provided. Each of the tooth portions 83T extends downward from a lower surface of the flange 84. As a result, a step is produced in a boundary portion between the flange 84 and each of the groove portions 83D. In this embodiment, a dimension of each of the tooth portions 83T in the up-down direction is approximately half a dimension of the gear body 83 in the up-down direction. An addendum of each of the tooth portions 83T moves to the vehicle front side as extending upward. That is, each of the tooth portions 83T is inclined to extend such that each of the tooth portions 83T is inclined toward the vehicle front side in an upward direction. In the drawings, only some of the plurality of the tooth portions 83T and only some of the plurality of the groove portions 83D are denoted by the reference numerals and symbols. At a center of the semicircle of the gear body 83, a through hole 85 penetrates the gear body 83 in an axial direction of the gear body 83.

As shown in FIG. 8 and FIG. 9, the gear body 83 of the holder portion 81 is inserted between the upper plate portion 65 and the lower plate portion 66 of the support portion 61. Then, a shaft of a shaft pin 87, which penetrates the circular hole 65b of the upper plate portion 65 from above, is inserted in the through hole 85 of the gear body 83. Similarly, a shaft of the other shaft pin 87, which penetrates the circular hole 66b of the lower plate portion 66 from below, is inserted in the through hole 85 of the gear body 83. Accordingly, the holder portion 81 can rotate in the vehicle width direction with respect to the support portion 61 with the shaft of each of the shaft pins 87 being a rotation shaft.

The tooth portions 83T of the holder portion 81 mesh with the tooth portions 73T of the gear portion 73. That is, each of the tooth portions 83T in the holder portion 81 functions as a projected portion that is locked in corresponding one of the groove portions 73D in the gear portion 73.

As shown in FIG. 7, a coupling portion 86 is attached to the surface on the vehicle front side of the base portion 82. The coupling portion 86 has a rectangular plate shape that is long in the vehicle width direction. In a thickness direction of the coupling portion 86, a screw hole 86a penetrates each of four corners of the coupling portion 86.

An attachment 91 is fixed to a surface on the rear side of the coupling portion 86 via screws S3, each of which is inserted through the screw hole 86a. In this embodiment, the attachment 91 is configured as a display holder used to hold equipment, such as a smartphone or a tablet computer, having a display.

A description will be made on operational effects of this embodiment. When the holder subassembly 40 is fixed to the retainer subassembly 10, the adapter 41 of the holder subassembly 40 is inserted in the case body 22 via the opening 33 of the outer panel 31 in the retainer subassembly 10. At this time, a tip of the lock claw 25 in the lock mechanism 24 abuts a projected tip of the guide rib 43 in the adapter 41. The projection lengths of the guide ribs 43 are increased in the direction toward the vehicle rear side of the adapter 41. Thus, the lock claw 25 moves (retreats) in a direction toward the mechanism portion 24a as the case body 22 is inserted in the direction toward the vehicle front side. Accordingly, when the adapter 41 is inserted, the lock claw 25 can overcome the step between the adjacent locking recess portions 42 of the adapter 41. Therefore, when the adapter 41 is inserted in the case body 22, there is no need to perform an operation to press the button portion 24b of the lock mechanism 24 to the mechanism portion 24a side. On the contrary, in the case where it is attempted to pull out the adapter 41 to the rear side from the case body 22, the lock claw 25 of the lock mechanism 24 is stuck by the step between the locking recess portions 42. Thus, the adapter 41 is not pulled out of the case body 22 by itself unless the button portion 24b of the lock mechanism 24 is pressed to the mechanism portion 24a side.

By the way, as described above, the case body 22 has the inversely tapered shape in which the opening area is increased in the direction toward the vehicle rear side. This is because, in the case where the case body 22 is shaped by using a mold, it is difficult to remove the mold unless the case body 22 has the inversely tapered shape in a greater or lesser degree. In the case where the case body 22 has the inversely tapered shape, just as described, a clearance is possibly produced between the outer surface of the adapter 41 and the inner surface of the case body 22 at the time when the adapter 41 is inserted in the case body 22. If the clearance is produced therebetween, the adapter 41 and the case body 22 rattle at the time when vibrations of the vehicle are transmitted to the holder device H, which generates rattling noise.

In this embodiment, the spacer 51 is attached to the adapter 41, and the spacer 51 fills the clearance between the adapter 41 and the case body 22. In addition, as shown in FIG. 3, the upper edge of each of the spacer ribs 56 in the spacer 51 is inclined along the inclination of the upper wall portion 22U in the case body 22. Furthermore, as shown in FIG. 4, the inclined wall portion 55 in the spacer 51 is inclined along the inclination of the left wall portion 22L in the case body 22. Thus, each of the spacer ribs 56 in the spacer 51 is in surface contact with the upper wall portion 22U in the case body 22, and each of the spacer ribs 56 in the spacer 51 is in surface contact with the left wall portion 22L in the case body 22. Just as described, since the spacer 51 is in surface contact with the inner surface of the case body 22, it is possible to suppress the rattling between the adapter 41 and the case body 22.

The spacer 51 can slide with respect to the adapter 41. Accordingly, in the case where the adapter 41 is inserted in the case body 22, the spacer 51 moves relative to the adapter 41 in the vehicle front-rear direction even after the spacer 51 abuts the inner surface of the case body 22. Thus, the adapter 41 can be pulled out or inserted in the vehicle front-rear direction. Therefore, it is possible to change the position of the adapter 41 with respect to the case body 22 in the vehicle front-rear direction while maintaining the state where the spacer 51 abuts the inner surface of the case body 22.

A slight dimensional error possibly occurs to the case body 22 and the adapter 41 described above due to a production error. Even in the case where the dimensional error occurs, just as described, the spacer 51 can reliably abut the inner surface of the case body 22 due to a fact that the spacer 51 can slide with respect to the adapter 41.

More specifically, for example, it is assumed that the dimension of the adapter 41 in the up-down direction is smaller than the dimension of the adapter 41 in the up-down direction shown in FIG. 3. In this case, at a position in front of the position in the state shown in FIG. 3, the spacer 51 abuts the inner surface of the case body 22. On the contrary, it is assumed that the dimension of the adapter 41 in the up-down direction is larger than the dimension of the adapter 41 in the up-down direction shown in FIG. 3. In this case, at a position behind the position in the state shown in FIG. 3, the spacer 51 abuts the inner surface of the case body 22. Just as described, even in the case where the slight dimensional error occurs to the case body 22 and the adapter 41, the relative positions of the spacer 51 to the case body 22 and the adapter 41 are changed in the vehicle front-rear direction. Thus, the spacer 51 abuts the inner surface of the case body 22.

It is assumed that the spacer 51 is located in the rear portion of the adapter 41 at the time when the adapter 41 is attempted to be inserted in the case body 22. In such a case, when the adapter 41 is inserted in the case body 22, the spacer 51 may not be inserted deep in the case body 22, which produces the clearance between the spacer 51 and the case body 22. Thus, in order to cause the spacer 51 to reliably abut the inner surface of the case body 22, the spacer 51 has to be located on the front end side of the adapter 41 when the adapter 41 is inserted in the case body 22.

In view of such a point, in this embodiment, the spacer 51 is urged to the front end side of the adapter 41. Thus, when the adapter 41 is pulled out from the case body 22, the spacer 51 moves to the front end side of the adapter 41. Therefore, when the spacer 51 is inserted in the case body 22 again, it is not required to manually move the spacer 51 to the front end side of the adapter 41.

Here, the restricting projection 46 is projected from the upper surface of the flexing spring 45 in the adapter 41. When the spacer 51 abuts this restricting projection 46, the spacer 51 is restricted from moving in front of the restricting projection 46. Thus, detachment of the spacer 51 from the adapter 41 to the front side is prevented. In addition, when the flexing spring 45 flexes downward, the restricting projection 46 can be located below the upper surface of the upper wall portion 41U in the adapter 41. Thus, the spacer 51 can be attached to the adapter 41 by causing the flexing spring 45 to flex.

In this embodiment, the holder portion 81 can rotate with respect to the support portion 61 with the shaft pins 87 being the rotation shaft. Then, the tooth portions 83T of the gear body 83 in the holder portion 81 are locked to the groove portions 73D of the knob gear 71 in the support portion 61. In this way, the rotation of the holder portion 81 with respect to the support portion 61 is restricted, and the position of the holder portion 81 is thereby kept. In addition, the plurality of the groove portions 73D are provided in the knob gear 71. Thus, even when a rotation position of the holder portion 81 with respect to the support portion 61 is changed, the tooth portions 83T of the gear body 83 can be locked to the groove portions 73D of the knob gear 71. That is, the position of the holder portion 81 can be kept at any of a plurality of the rotation positions.

By the way, as described above, in the case of a structure in which the tooth portions 83T of the gear body 83 are locked to the groove portions 73D of the knob gear 71, it is general to provide a clearance (a backrush) between each of the groove portions 73D and corresponding one of the tooth portions 83T such that the groove portions 73D and the tooth portions 83T are locked even when a slight dimension error occurs to the groove portions 73D and the tooth portions 83T. However, in the case where the clearance is provided, just as described, the knob gear 71 (the support portion 61) and the gear body 83 (the holder portion 81) rattle when the vibrations of the vehicle are transmitted to the holder device H, which generates the rattling noise.

In this embodiment, as shown in FIG. 8, the knob gear 71 is urged upward by the coil spring 75. In addition, each of the tooth portions 73T of the knob gear 71 is inclined to extend with respect to the up-down direction, and each of the tooth portions 83T of the gear body 83 is also inclined to extend with respect to the up-down direction. Accordingly, when the knob gear 71 moves upward, the tooth portions 73T (the groove portions 73D) of the knob gear 71 are pressed against and abut the tooth portions 83T of the gear body 83. Thus, the knob gear 71 and the gear body 83 do not rattle due to the clearance between each of the tooth portions 73T of the knob gear 71 and corresponding one of the tooth portions 83T of the gear body 83.

In addition, in the case where the knob gear 71 is urged upward, the knob gear 71 possibly slips upward along the inclinations of the tooth portions 83T of the gear body 83. Meanwhile, the flange 84 is provided at the upper end of the gear body 83, and thus the step is produced in the boundary portion between each of the groove portions 83D and the flange 84. Accordingly, even in the case where the knob gear 71 slips upward, the tooth portions 73T of the knob gear 71 are stuck by the step in the gear body 83. Thus, the further upward movement of the knob gear 71 is restricted. Therefore, the knob gear 71 is not excessively displaced upward with respect to the gear body 83, and thus a circumstance where the knob gear 71 is detached from the upper side is unlikely to occur.

Note that, as shown in FIG. 9, when the knob gear 71 moves downward against the urging force of the coil spring 75, the tooth portions 73T of the knob gear 71 are located below lower ends of the tooth portions 83T of the gear body 83. As a result, a locking relationship between the knob gear 71 and the gear body 83 is canceled. Thus, when the knob gear 71 is operated to move downward, the tooth portions 73T of the knob gear 71 and the tooth portions 83T of the gear body 83 do not hinder the smooth rotation of the holder portion 81 with respect to the support portion 61.

As described above, in the case where the tooth portions 73T of the knob gear 71 are pressed against the tooth portions 83T of the gear body 83, a part of such a pressing force is applied to the shaft pins 87, each of which is inserted in the through hole 85 of the gear body 83. In the case where a large force is applied to each of the shaft pins 87 in the vehicle front-rear direction, which is perpendicular to an axial direction of each of the shaft pins 87, the shaft of each of the shaft pins 87 is possibly bent or deformed. In the case where the shaft of each of the shaft pins 87 is possibly bent or deformed, such bending or deformation hinders the smooth rotation of the holder portion 81 with respect to the support portion 61.

In this embodiment, as described above, the knob gear 71 is urged upward. Accordingly, in accordance with an inclination angle of each of the tooth portions 73T in the knob gear 71, a part of the urging force of the knob gear 71 is applied to the shaft pins 87 in the vehicle front-rear direction. However, the urging force of the knob gear 71 is mainly applied to the upper plate portion 65 and the lower plate portion 66 of the support portion 61 in the up-down direction. Accordingly, the force of the coil spring 75 to urge the knob gear 71 is unlikely to be applied to the shaft pins 87 in the vehicle front-rear direction. Thus, the bending and the deformation of each of the shaft pins 87 can be suppressed.

This embodiment can be modified and implemented as follows. This embodiment and the following modification examples can be combined for implementation within the scope that does not contradict technically. The configuration of the retainer subassembly 10 is not limited. Any configuration can be adopted as long as a hole, in which the adapter 41 can be inserted, is provided.

Furthermore, the retainer subassembly 10 can be eliminated in the case where the instrument panel is provided in advance with the hole in which the adapter 41 can be inserted. Instead of or in addition to the attachment of the spacer 51 to the adapter 41, the spacer 51 may be attached to the inner surface of the case body 22.

Instead of the flexing spring 45 and the restricting projection 46 in the adapter 41, another configuration that restricts the slide movement of the spacer 51 may be adopted. For example, after the spacer 51 is attached to the adapter 41, the screw may be tightened in the upper wall portion 41U of the adapter 41. In the case where a part of the screw (a screw head) is projected upward from the upper surface of the upper wall portion 41U, such a projected portion can restrict the slide movement of the spacer 51.

The torsion spring 57 and the like used to urge the spacer 51 may not be provided. In the case where the spacer 51 moves to the front end side of the adapter 41 and thereafter the adapter 41 is inserted, the spacer 51 can fill the clearance between the adapter 41 and the case body 22 even when the spacer 51 is not urged.

The spacer 51 may not be slidable. For example, in the case where the spacer 51 is formed of an elastic member such as rubber, elastic deformation of the spacer 51 can compensate for the dimensional error of the adapter 41 and the case body 22.

The spacer 51 may not be provided. The elimination of the spacer 51 does not become problematic in the case where the dimensional error of the adapter 41 and the case body 22 is small, and thus the rattling is unlikely to occur.

The shape of the adapter 41 can appropriately be changed. The shape of the adapter 41 may appropriately be changed in accordance with a shape of the hole in which the adapter 41 is inserted. The support portion 61 may not be able to rotate with respect to the adapter 41. That is, the support portion 61 may be slidable in the front-rear direction or in the width direction with respect to the adapter 41. Furthermore, the adapter 41 and the support portion 61 may be fixed to each other in a manner not to be able to move relative to each other.

The adapter 41 may not be provided. In this case, the support portion 61 may be fixed to the retainer subassembly 10, or the support portion 61 may directly be fixed to the instrument panel. A component corresponding to the knob gear 71 may be provided in the holder portion 81, and a component corresponding to the gear body 83 may be provided in the support portion 61. That is, the operating portion may be provided in the second joint portion of the holder portion 81.

The tooth portions 73T of the knob gear 71 and the tooth portions 83T of the gear body 83 may not extend in the direction to be inclined with respect to the up-down direction. That is, the tooth portions 73T of the knob gear 71 and the tooth portions 83T of the gear body 83 may extend in the up-down direction. In this case, in the vehicle front-rear direction, the knob gear 71 is urged rearward. In this way, the tooth portions 73T of the knob gear 71 can be pressed against the tooth portions 83T of the gear body 83.

The number of the tooth portions 73T of the knob gear 71 and the number of the tooth portions 83T of the holder portion 81 are not limited. As long as the one tooth portion is provided in at least one of the knob gear 71 and the holder portion 81, and the one groove portion is provided in the other of the knob gear 71 and the holder portion 81, the number of the tooth portions 73T of the knob gear 71 and the number of the tooth portions 83T of the gear body 83 can appropriately be changed in accordance with a rotation range of the holder portion 81, and the like.

The locking relationship between the support portion 61 (the knob gear 71) and the holder portion 81 (the gear body 83) is not limited to the example thereof in the above embodiment. For example, a projection may be provided in one of the support portion 61 and the holder portion 81, and a hole, to which the projection is fitted, may be provided in the other of the support portion 61 and the holder portion 81.

The rotation direction of the holder portion 81 with respect to the support portion 61 may be changed. For example, the holder portion 81 may be able to rotate in the vehicle width direction with respect to the support portion 61. Alternatively, the holder portion 81 may be able to move linearly with respect to the support portion 61. For example, as the configurations of the knob gear 71 in the support portion 61 and the gear body 83 in the holder portion 81, a rack-and-pinion structure may be adopted instead of the structure described in the above embodiment. In such a case, the holder portion 81 can move linearly with respect to the support portion 61.

The structure of the attachment 91 is not limited. For example, as the attachment 91, a drink holder or an accessory case may be adopted instead of the display holder. Furthermore, the attachment 91 may not be provided as long as the coupling portion 86 of the holder portion 81 has a function of being able to hold an object.

What is claimed is:

1. A holder device comprising:
    a holder portion configured to hold an item; and
    a support portion configured to support the holder portion, wherein
    the holder portion is coupled to the support portion in such a manner as to be movable relative to the support portion,
    a first joint portion provided in the support portion is locked to a second joint portion provided in the holder portion such that a relative movement of the holder portion to the support portion is restricted,
    one of the first joint portion and the second joint portion is movable in directions toward and away from the other of the first joint portion and the second joint portion, and the one of the first joint portion and the second joint portion is urged by an urging member to a side where the one of the first joint portion and the second joint portion contacts the other of the first joint portion and the second joint portion,
    the one of the first joint portion and the second joint portion is provided with an operating portion configured to move the one of the first joint portion and the second joint portion in the direction away from the other of the first joint portion and the second joint portion against an urging force of the urging member,
    the holder portion is rotatably coupled to the support portion through a rotation shaft,
    the second joint portion includes a plurality of holder-side tooth portions arranged in a circumferential direction with the rotation shaft being a center,
    the first joint portion includes a plurality of support portion-side tooth portions, each of which meshes with and is locked to a corresponding one of the holder-side tooth portions,
    each of the holder-side tooth portions extends to be inclined with respect to a central axis of the rotation shaft such that the holder-side tooth portion is inclined toward the first joint portion in a direction toward one side in a direction of the central axis of the rotation shaft, and
    each of the support portion-side tooth portions extends to be inclined with respect to the central axis of the rotation shaft such that the support portion-side tooth portion is inclined toward the second joint portion in a direction toward the other side in the direction of the central axis of the rotation shaft.

2. The holder device according to claim 1, wherein
    the one of the first joint portion and the second joint portion includes a plurality of groove portions that are arranged in a direction in which the holder portion moves relative to the support portion, and
    the other of the first joint portion and the second joint portion includes projected portions that are locked in the groove portions.

3. The holder device according to claim 1, wherein
    the urging member urges the one of the first joint portion and the second joint portion in the direction of the central axis of the rotation shaft.

4. The holder device according to claim 1, further comprising:
    an adapter coupled to the support portion;
    a case in which the adapter is inserted; and
    a spacer interposed between an outer surface of the adapter and an inner surface of the case wherein
    the spacer is attached to the adapter or the case in such a manner as to be slidable in a direction in which the adapter is pulled out from or inserted in the case.

5. The holder device according to claim 4, wherein
    the spacer is attached to the adapter, and is urged toward an end portion of the adapter, the end portion being inserted in the case.

6. The holder device according to claim 5, wherein
    a main wall portion of the spacer has a rectangular plate shape,
    a dimension of the main wall portion in a vehicle width direction is smaller than a dimension of the adapter in the vehicle width direction, and
    a dimension of the main wall portion in a vehicle front-rear direction is smaller than a dimension of the adapter in the vehicle front-rear direction.

7. The holder device according to claim 6, wherein
    a left edge of the main wall portion in the vehicle width direction is inclined with respect to a right edge of the main wall portion in the vehicle width direction.

8. The holder device according to claim 7, wherein
    a pair of spacer ribs is projected from an upper surface of the main wall portion, and
    in the vehicle front-rear direction, the spacer rib extends from a rear edge to a front edge of the main wall portion, and a projection length of the spacer rib in an up-down direction is reduced in a direction toward a vehicle front side.

* * * * *